United States Patent [19]
Kaeriyama et al.

[11] Patent Number: 6,008,967
[45] Date of Patent: Dec. 28, 1999

[54] HYBRID TYPE MAGNETIC HEAD SLIDER HAVING A THIN FILM COIL

[75] Inventors: Naomi Kaeriyama; Akinobu Sano, both of Shizuoka-ken, Japan

[73] Assignee: Minebea Co., Ltd., Kitasaku, Japan

[21] Appl. No.: 09/001,189

[22] Filed: Dec. 30, 1997

[30] Foreign Application Priority Data

Feb. 6, 1997 [JP] Japan .................................. 9-023813

[51] Int. Cl.⁶ ....................................................... G11B 5/60
[52] U.S. Cl. .................................................................. 360/103
[58] Field of Search ............................................... 360/103

[56] References Cited

U.S. PATENT DOCUMENTS

| | | | |
|---|---|---|---|
| 4,673,996 | 6/1987 | White | 360/103 |
| 5,255,139 | 10/1993 | Von Huene et al. | 360/103 |
| 5,260,845 | 11/1993 | Takayama et al. | 360/103 |
| 5,636,085 | 6/1997 | Jones et al. | 360/103 |
| 5,717,543 | 2/1998 | Ito et al. | 360/103 |

*Primary Examiner*—Robert S. Tupper
*Attorney, Agent, or Firm*—Staas & Halsey LLP

[57] ABSTRACT

A magnetic head slider including two housing portions made of non-magnetic material, each portion having a rail on a surface thereof to face a magnetic recording medium and generate a floating force. One of the housing portions houses a core part, and the other housing portion houses a coil part. A magnetic core is disposed in the housing, i.e., A gap of the core part for reading/writing is positioned nearly flush with an upper surface of each rail.

4 Claims, 11 Drawing Sheets

Traveling direction of a recording medium

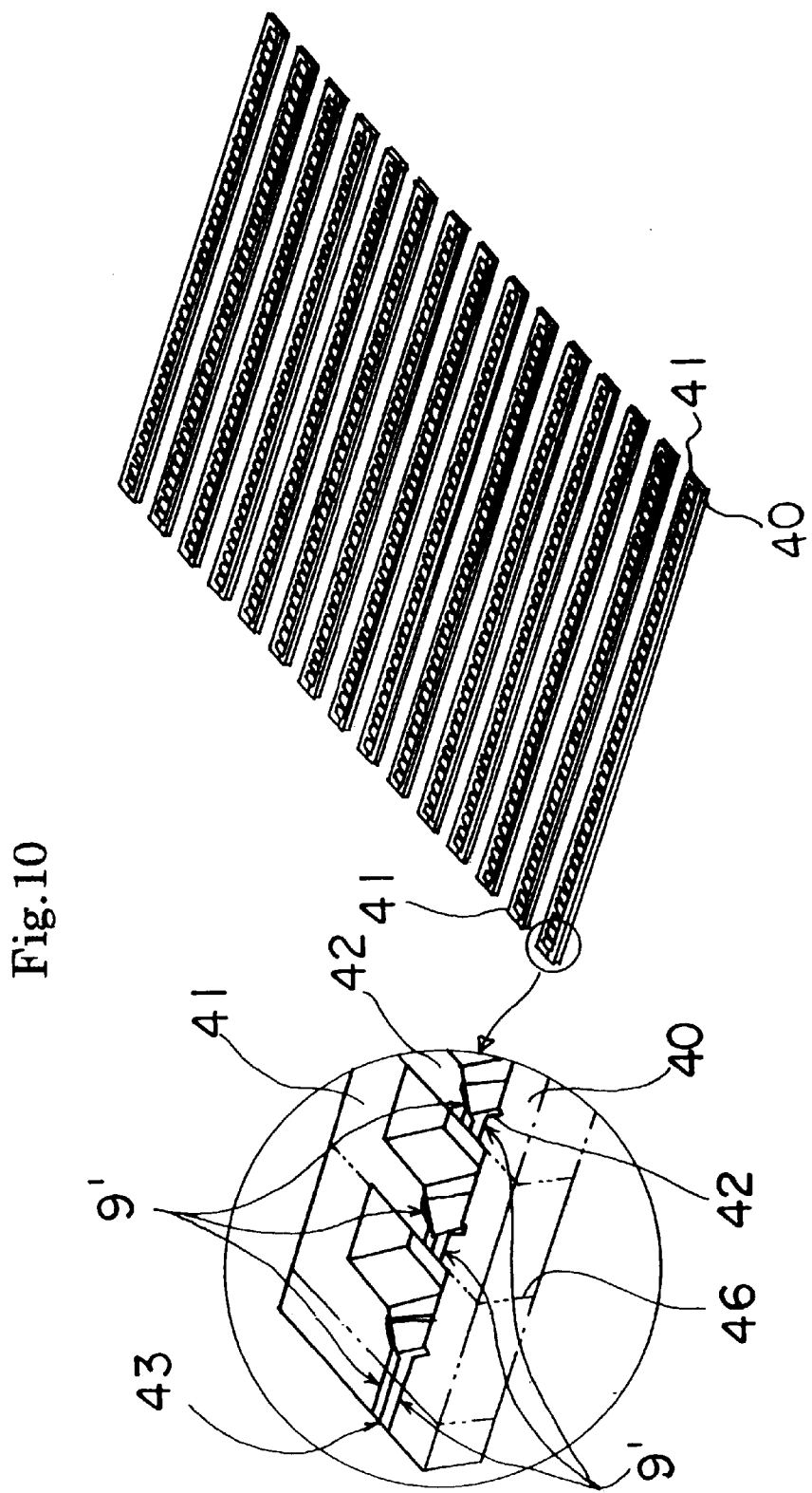

PRIOR ART

PRIOR ART

HYBRID TYPE MAGNETIC HEAD SLIDER HAVING A THIN FILM COIL

BACKGROUND OF THE INVENTION

1. Field of the Invention

This invention is generally related to a hybrid type magnetic head slider having a thin film coil and a manufacturing method thereof, in particular, related to those applied to a magnetic recording apparatus such as a hard disk apparatus and a floppy disk apparatus which are auxiliary recording apparatus for an electric computer.

2. Description of the Prior Art

Magnetic recording apparatus could be classified into two types one of which uses a flexible medium as a floppy disk apparatus and the other of which uses a hard medium as a hard disk apparatus.

At present, a plastic film is mainly applied as the flexible medium to an apparatus having a storage capacity of about 120 mega-bytes or less, and a glass or aluminum plate or the like is largely applied as the hard medium to an apparatus having a storage capacity of more than 120 megabytes. The flexible medium of the former is rotated at a rotational speed of from several hundreds to several thousands of revolutions per minute, and is subjected to writing and reading of information through contact with a magnetic head slider. On the other hand, the hard medium of the latter is rotated at a rotational speed of several thousands of revolutions per minute, and the magnetic head slider performs writing and reading of information while it keeps floating over the medium at a distance of several tens nm.

Summarizing the basic structures in common with both media, though both types are slightly different from each other, there is a ground film on a substrate in general. There are formed a single layer or multiple layers of magnetic powders of $\gamma$-$Fe_2O_3$, Co metamorphic $\gamma$-$Fe_2O_3$, $CrO_2$, Fe alloys, barium ferrite or the like on the surface of the ground film, and there are further deposited thereon an amorphous carbon film, DLC (diamond-like carbon) film, $SiO_2$ film or the like as a protective coat. The outer surface is finally coated with a lubrication film of fluoropolymers.

On the other hand, a magnetic head slider comprises a housing made of non-magnetic ceramic materials such as zirconia $ZrO_2$, barium titanate $BaTiO_3$, calcium titanate $CaTiO_3$, alutic $Al_2O_3$-$TiO_3$ or the like and a ferrite core part having a small gap to face a magnetic recording medium for writing and reading.

Since a magnetic head slider contacts a magnetic recording medium rotating at a high speed during a read/write operation, a contacting part of the flexible type medium is liable to abrasion. Such a phenomenon may occur also when a hard type medium is used, however, it is a more serious problem in a flexible type medium because a flexible type medium is subjected to elastic deformation due to a pressure from a magnetic head slider while it rotates at a high speed and therefore is liable to more abrasion than a hard type medium.

As the prior art disclosing a magnetic head slider applicable to a fixed type hard medium, for example, Japanese Patent Laid-Open No. 6-20245, Japanese Patent Laid-Open No. 6-76223, Japanese Patent Laid-Open No. 6-76224 and the like are known.

Referring to Japanese Patent Laid-Open No. 6-20245 taken from among those in detail, FIG. 20 is a partly enlarged perspective view showing a magnetic head slider disclosed in the prior art. As clearly seen from FIG. 20, the magnetic head slider comprises a substrate 100 of a non-magnetic body provided with a triangular cut groove 101 on one corner and two rails 103, 104 formed on both sides of an upper surface 102 of the substrate 100. There is formed an air flow path between the rails 103, 104. A magnetic core part 105 to perform reading and writing of data with a magnetic recording medium (not shown) is attached to a side surface of the substrate 100. Also a coil 106 for read/write operation is wound on the core part 105. As seen from the enlarged part of FIG. 20, a slant part 107 is provided at the front part of the magnetic core part 105, and a width 108 of a plane area flush with the rail 104 is minimized to be the same as a track width of a high density recording medium. In addition, a numeral 109 indicates a magnetic film attached to the inside of the magnetic core part for decreasing magnetic resistance, and a numeral 110 denotes a gap part formed in the magnetic core part.

As seen from FIGS. 20 and 21, the magnetic core part 105 is positioned at the side surface of the substrate 100 and in parallel to a traveling direction of a magnetic recording medium. Whether a recording medium is of a hard type or of a flexible type, as long as the medium is rotated normally and the magnetic head slider is not vibrated, a slidable surface of the magnetic core part 105 is able to keep a floating position at a certain distance from the medium not to contact therewith because a fluid dynamic interaction occurs between the magnetic head slider and the magnetic recording medium. Thus, a stable traveling can be obtained. Referring to a flexible magnetic recording medium, a magnetic head slider travels in contact with the traveling surface of the medium 111 which rotates at a high speed and is subjected to elastic deformation locally as shown in FIG. 22, and when the traveling surface is shifted for any reason, such deformation and abrasion of an outer edge 112 of the magnetic head slider are promoted. Moreover, an end surface 113 at the top end of the magnetic core part 105 may be worn or lost.

The vicinity of the gap part 110 of the magnetic core part 105 is ground so that its width is matched with that of a track part of a magnetic recording medium, and after that it is assembled to the magnetic head slider. Accordingly, this thinned part is liable to breakage during handling. Also since the coil 106 wound on the core part 105 is formed by winding of a lead wire, a special technology for handling a fine structure is required to assemble the coil 106 to the core part 105 whether it is assembled automatically or manually. Moreover, it takes a long time for such a subtle assembly.

In order to eliminate various disadvantages as described above, an object of the present invention is to provide a magnetic head slider to perform writing/reading of data with a magnetic recording medium in traveling, where the top end of the core part is not worn or lost and the data can be written and read stably even if the magnetic head slider contacts the magnetic recording medium of a hard type or flexible type. Another object of this invention is to provide a manufacturing method of a magnetic head slider that is simple and easy, according to which the core part of the magnetic head slider is not liable to breakage while it is assembled.

SUMMARY OF THE INVENTION

In order to attain the foregoing objects, a hybrid type magnetic head slider of the invention comprises: a housing of non-magnetic material having a rail part on a surface there of to face a magnetic recording medium for generating a floating force; a housing divided into a plurality of housing portions; a magnetic core part at one housing portion for writing and reading data; the magnetic core part being disposed between these divided housing portions; and a gap part of the magnetic core part is positioned substantially flush with a surface of the rail part. A thin-film coil can be used as a coil applied to the magnetic core part. Also two rail parts can be provided on two divided portions of the housing respectively and positioned in parallel to the traveling direction of a magnetic recording medium. Further, each rail part is divided into two small rail parts in tandem along the traveling direction of a magnetic recording medium and a couple of divided small rail parts are disposed in each portion of the housing. Still further, an outer edge line of each rail part is rounded for forming a buffer to contact smoothly with the traveling surface of a magnetic recording medium.

The invention also provides a hybrid type manufacturing method of a magnetic head slider comprising a housing of non-magnetic material having a rail part on a surface there of to face a magnetic recording medium for generating a floating force, the housing being divided into a plurality of housing portions and a magnetic core part sandwiched between two housing portions, the method comprising: a step of fixing a couple of core pieces for a magnetic core part to a side surface of one housing portion, a step of grinding the vicinity of the gap part of the core piece to match a width of the tip of the gap part with a width of a track part of the magnetic recording medium, and a step of joining the housing portions to sandwich the magnetic core part therebetween. In the grinding, the tip of the gap part is ground uniformly thinner so that the gap part forms a step-like shape in cross section and a width of the tip is matched with a width of a track part of a magnetic recording medium, alternately the tip of the gap part is ground for forming a slant with a thickness of the core piece decreasing gradually so that a width of the tip is matched with a track part of a magnetic recording medium.

BRIEF DESCRIPTION OF THE DRAWINGS

FIG. 10 is a partially enlarged perspective view showing a manufacturing method of an embodiment of the invention.

DESCRIPTION OF THE PREFERRED EMBODIMENTS

Figure 1:
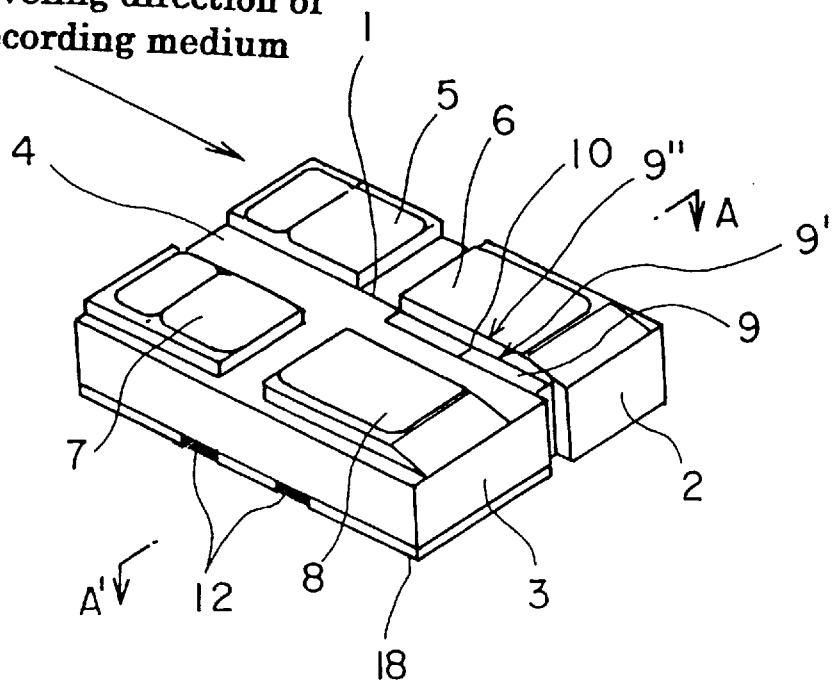
FIG. 1 is a perspective view of a hybrid magnetic head slider of the invention, being seen from the rail bearing surface.
Figure 2:
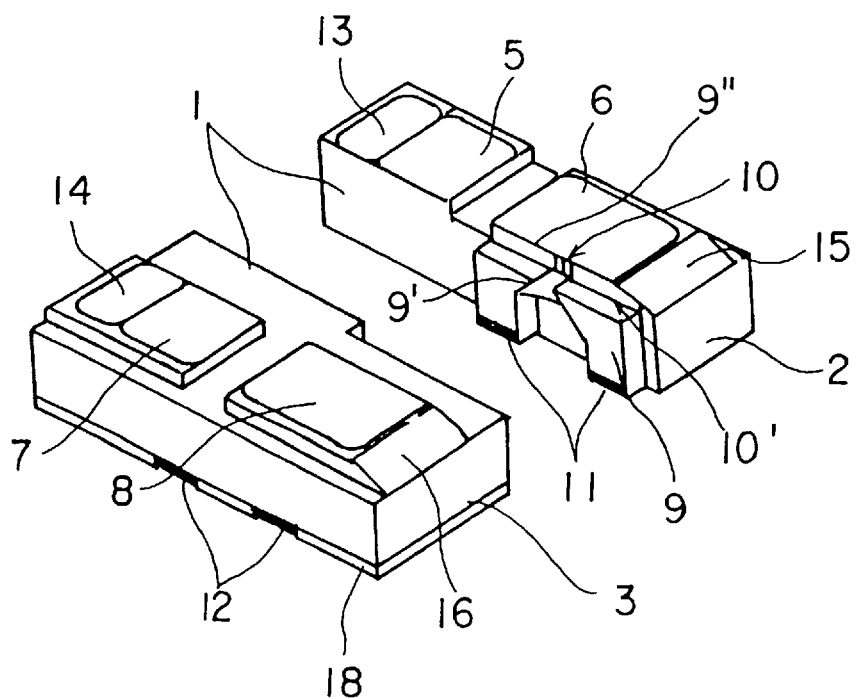
FIG. 2 is a perspective view where the housing of the hybrid magnetic head slider in FIG. 1 is taken apart to two housing portions.
Figure 3:
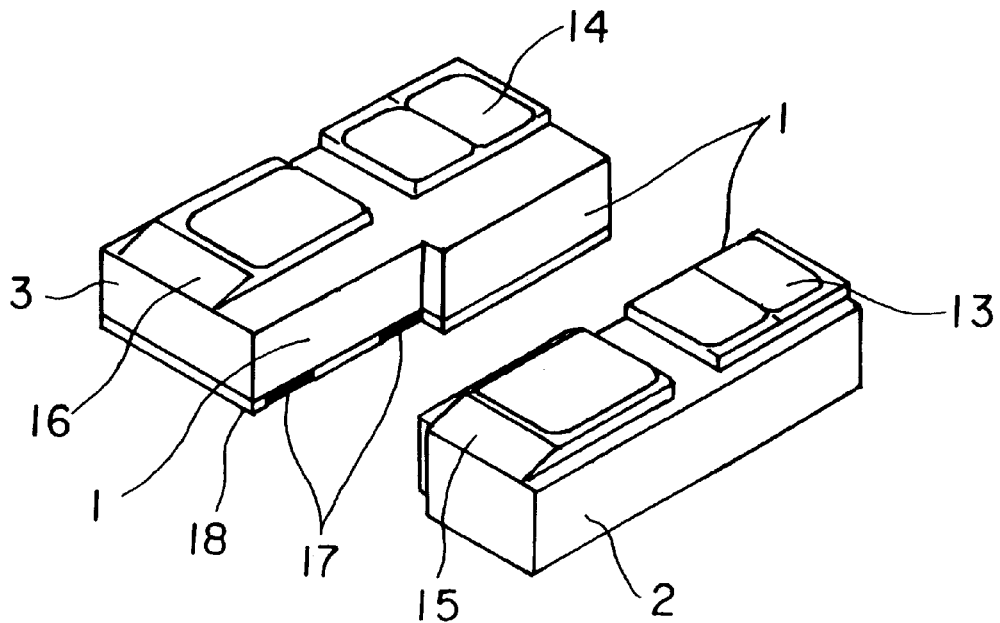
FIG. 3 a perspective view where the hybrid magnetic head slider in FIG. 2 is viewed from a different side from that in FIG. 2.
Figure 4:
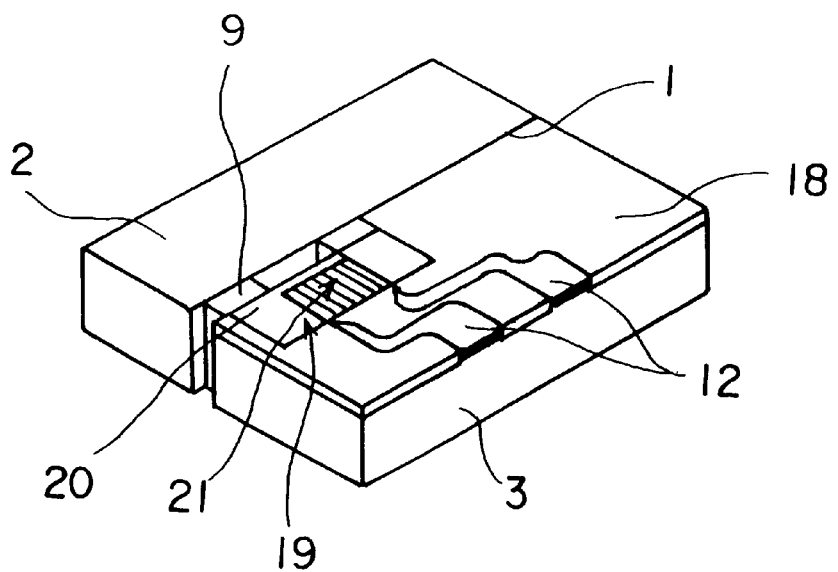
FIG. 4 is a perspective view of a hybrid magnetic head slider of the invention, being seen from the reverse side of the rail bearing surface.
Figure 5:
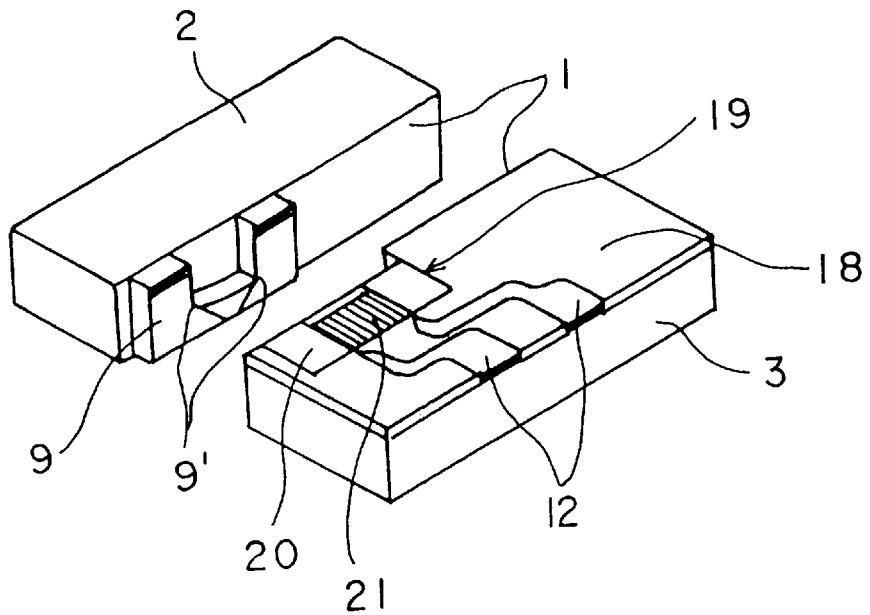
FIG. 5 is a perspective view where the housing of the hybrid magnetic head slider in FIG. 4 is taken apart to two housing portions.
Figure 6:
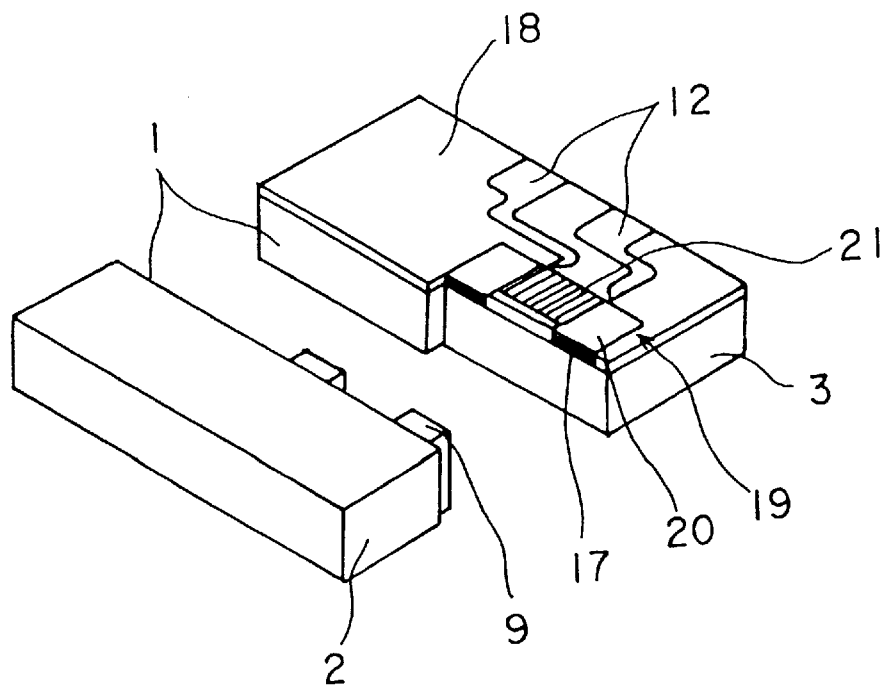
FIG. 6 is a perspective view where the hybrid magnetic head slider in FIG. 5 is viewed from a different side from that in FIG. 5.

Embodiments of the present invention will be described in detail below in conjunction with the accompanying drawings. FIGS. 1 to 6 are diagrams showing a hybrid type magnetic head slider using a thin-film coil according to the present invention. FIG. 1 is a perspective view of the hybrid type magnetic head slider viewed from a rail surface, that is, from a surface to face a magnetic recording medium. FIG. 2 is an exploded view in perspective of the hybrid type magnetic head slider in FIG. 1 to show the magnetic core part. FIG. 3 is an exploded view in perspective of the hybrid type magnetic head slider in FIG. 1 to show a surface not holding the magnetic core part. FIG. 4 is a perspective view of the hybrid type head slider viewed from the reverse side of the surface to face the magnetic recording medium. FIG. 5 is an exploded view in perspective of the hybrid type magnetic head slider in FIG. 4, and FIG. 6 is an exploded view in perspective of the hybrid type magnetic head slider in FIG. 4 to show the surface not holding the magnetic core part.

A hybrid type magnetic head slider of the embodiment has a core housing 2 and a coil housing 3 divided along a housing junction surface 1 running in the longitudinal direction at the center. The core housing 2 and the coil housing 3 are made of zirconia ($ZrO_2$) material having a high abrasion resistance. A couple of rail parts 5, 6 and another couple of rail parts 7, 8 protrude from the core housing 2 and the coil housing 3 respectively, and it is a surface 4 having these rail parts that faces a magnetic recording medium. That is, these rail parts are disposed on the surface 4 in two rows and two columns in the traveling direction.

In FIGS. 1 and 2, numeral 9 denotes a magnetic core part fixed to side surface of the core housing 2. The magnetic core part 9 comprises a couple of core pieces of monocrystalline ferrite, and a gap part 10 is formed at one end of the magnetic core part 9 where the core pieces come closest to each other. At the other end of the magnetic core part 9 there is formed a junction surface 11 with a thin-film coil part 19 as described later. The one end of the magnetic core part 9 with the gap part 10 is cut into a step-like shape in cross sectional view taken in the longitudinal direction so that a thin portion 9" having the same width as that of a track of a magnetic recording medium is formed adjacent to a side surface of the rail part 6 and at the same time a groove 10' is formed. A magnetic film 9' made of FeTaN film is fixed to an inside of the magnetic core part 9 close to the gap part 10 in the same manner as the prior art. An extended terminal 12 of the thin-film coil is formed on the back side of the coil housing 3.

The forward surfaces of the rail parts 5 and 7 are slightly slanted downward so that air inflow parts 13, 14 are formed. The rear surfaces of the rail parts 6 and 8 are slightly slanted downward so that air outflow parts 15, 16 are formed. As seen from FIG. 3, there is formed a junction surface 17 to join with the junction surface 11 of the magnetic core part 9 on the lower side of the housing junction surface 1 of the coil housing 3.

Figure 7:
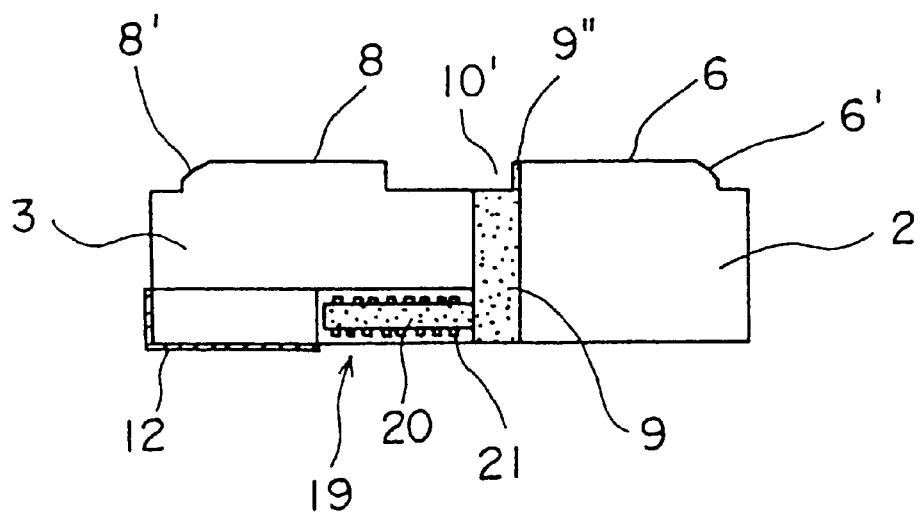
FIG. 7 is a cross sectional view taken on line A–A' of FIG. 1.

As clearly seen from FIGS. 4, 5 and 6, a non-magnetic plate 18 made of zirconia ($ZrO_2$) material is attached to the back side of the coil housing 3. A part of the non-magnetic plate 18 corresponding to the magnetic core part 9 is cut away and the thin-film coil part 19 is embedded therein. In the thin-film coil part 19, a coil 21 made of copper is wound on a surface of a plate body 20 made of permalloy (NiFe). The coil 21 is connected to the extended terminals 12 made of copper attached to a surface of the non-magnetic plate 18. The junction surface 17 formed on the top end of the plate body 20 contacts the junction surface 11 of the magnetic core part 9. The adhesion layer applied to these junction surfaces is preferably made several μm or less in thickness so as to suppress reduction of magnetic circuit efficiency. As clearly seen from FIG. 7, the side edge lines of the rail parts 6, 8 are rounded by grinding so that buffers 6', 8' are formed thereon for smooth contact with a magnetic recording medium. In addition, although not shown in FIG. 7, such buffers are formed also on the rail parts 5, 7.

Figure 8:
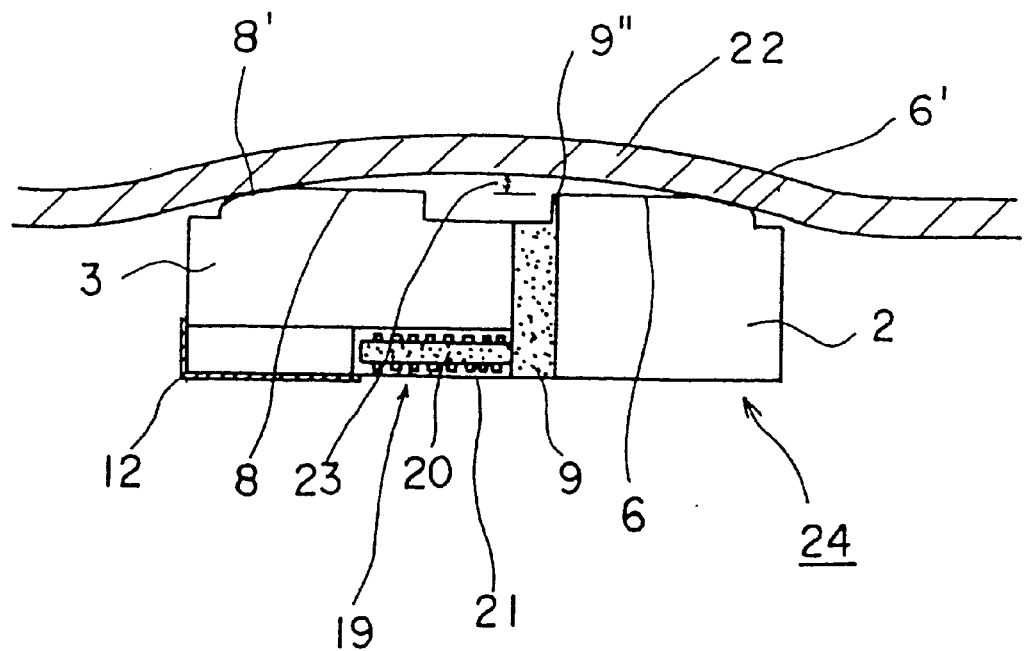
FIG. 8 is a cross sectional view where a magnetic head slider of the invention contacts with a traveling surface of a flexible type recording medium by a certain force.

FIG. 8 is a sectional view showing that a magnetic head slider 24 contacts a traveling surface of a rotating flexible magnetic recording medium 22 with a certain force. The magnetic core part 9 of the magnetic head slider 24 is disposed between the rail parts 6, 8. The flexible medium 22 rotating at a high speed contacts locally the buffers 6', 8' on the outer edge lines of the rail parts 6, 8, and there is formed a gap 23 between the thin portion 9" of the magnetic core part 9 and the magnetic recording medium 22 because the flexible magnetic recording medium 22 is subjected to elastic deformation. Since the gap 23 is several tens nm or less in distance, an electromagnetic conversion efficiency with the medium 22 is not deteriorated.

Figure 22:
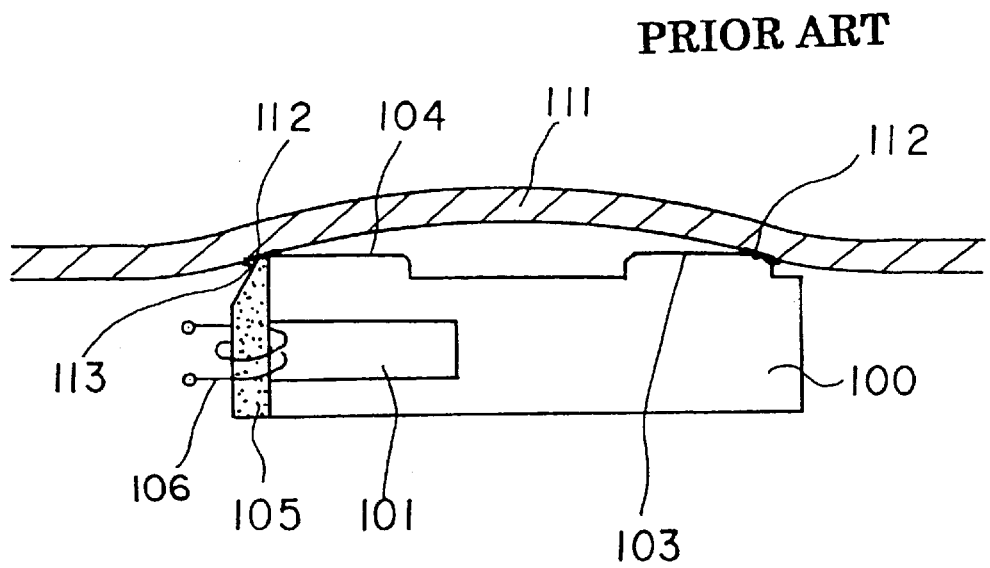
FIG. 22 is a cross sectional view where a magnetic head slider in the prior art contacts a magnetic recording medium.

Accordingly, formation of the gap 23 solves the problem of the prior art in FIG. 22 that the top end 113 of a gap part of the magnetic core part 105 contacts the magnetic recording medium 111 and thereby is cut away finally.

Figure 9:
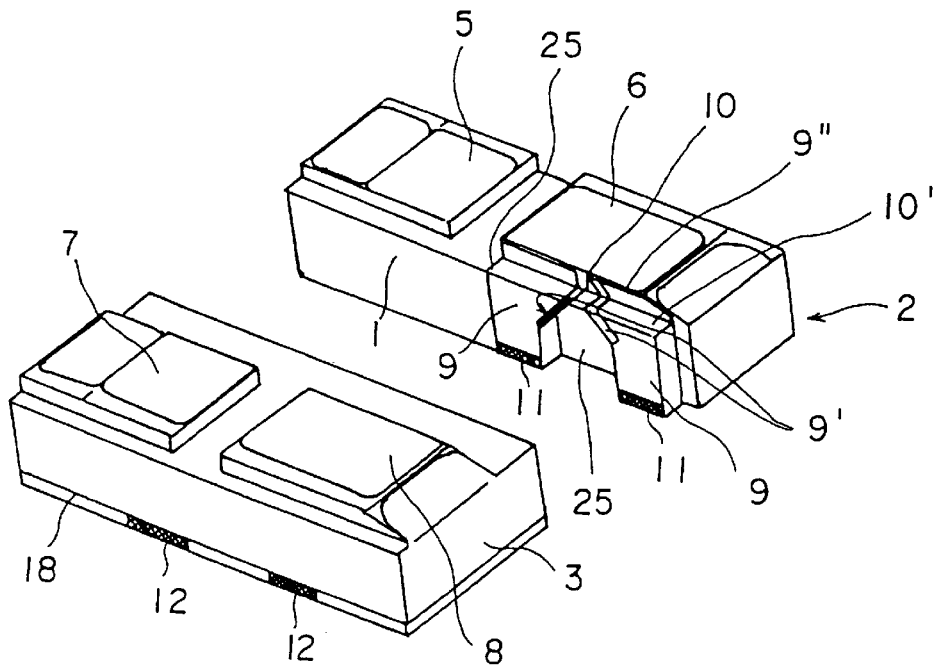
FIG. 9 is an exploded view in perspective of another embodiment of the invention.

In the above-mentioned embodiments, the magnetic core part 9 is fixed to the housing junction surface 1 of the core housing 2 which is made flat over the whole surface. Alternately, as shown in FIG. 9, the housing junction surface 1 is provided with a groove 25 having suitable dimensions for embedding the core part 9 therein, and both of the housing junction surface 1 and the magnetic core part 9 embedded therein are ground together and flattened to be flush with each other. After that, the coil housing 3 is fixed to the core housing 2.

The manufacturing method of a magnetic hybrid magnetic head slider will now be described in conjunction with the drawings.

In FIG. 10, as particularly shown in the enlarged circle, square poles 40, 41 of ferrite are subjected to a cutting operation whereby a plurality of protrusions 42 extend from each pole along its longitudinal direction so that a couple of protrusions 42 from the poles 40 and 41 face each other to constitute the corresponding gap 10 therebetween. Next, magnetic films 9' (MIG films) are deposited on the protrusion surfaces in the vicinity of the gaps 10 by a sputtering method. The facing surfaces 43 of each gap is fixed together by glass adhesive for glass bonding. Thus, there is obtained a stick body having a plurality (see phantom lines 46) of magnetic core parts in its longitudinal direction as shown in FIG. 10.

Figure 11:
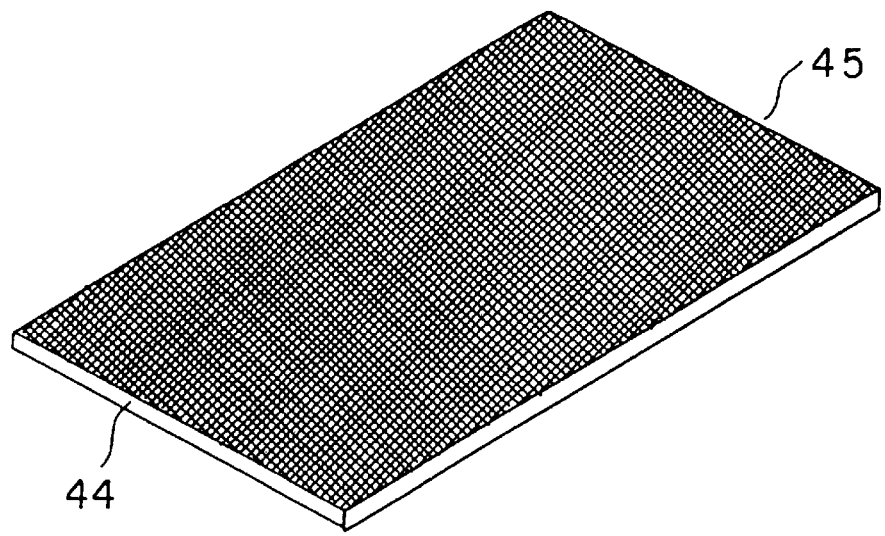
FIG. 11 is a perspective view of a non-magnetic plate to be used in a manufacturing method of an embodiment of the invention.
Figure 12:
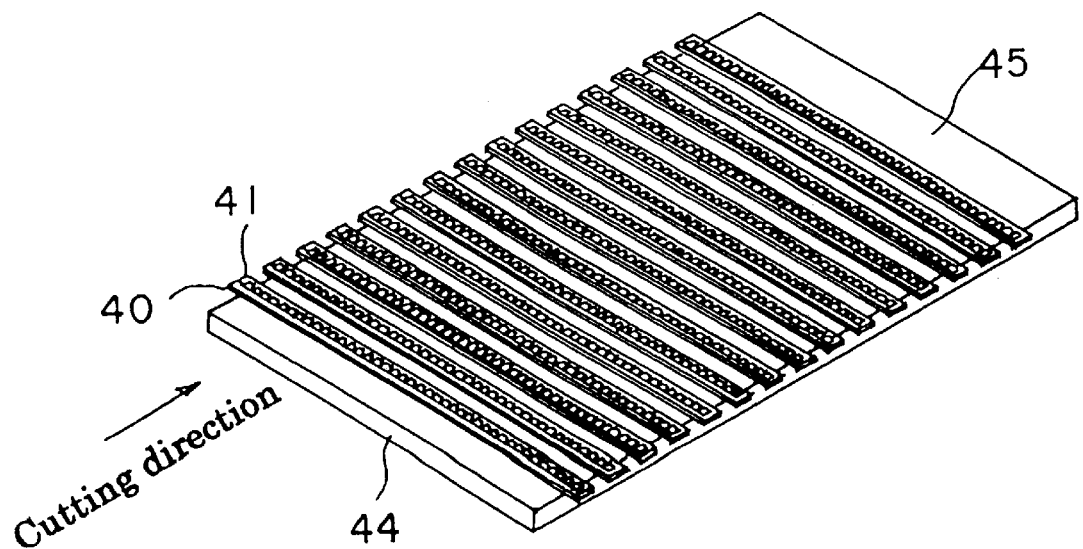
FIG. 12 is a perspective view where core pieces are put on a nonmagnetic plate in a manufacturing step of an embodiment of the invention.

A glass thin film 45 for glass bonding is deposited, as shown in FIG. 11, on a non-magnetic plate 44 of zirconia ($ZrO_2$) material previously polished like a mirror surface and having a thickness of 3000–5000 Å by a sputtering method. The stick bodies obtained as above are put on the glass thin film 45 in 10–20 rows and are fixed temporarily thereon. The plate 44 is heated to about 400° C. in an electric furnace to melt the glass thin film 45, and then the stick bodies are completely fixed to the plate 44. Subsequently the plate 44 is cut in the direction of the arrows in FIG. 12, according to the cutting lines 46 shown in the enlarged circle in FIG. 10, thus each rod 55 of zirconia bearing a plurality of the magnetic core parts 9 is obtained. Then, there is formed a corner cut 48 about 100 μm deep along the edge line thereof on the reverse surface of the core junction surface 47.

Figure 20:
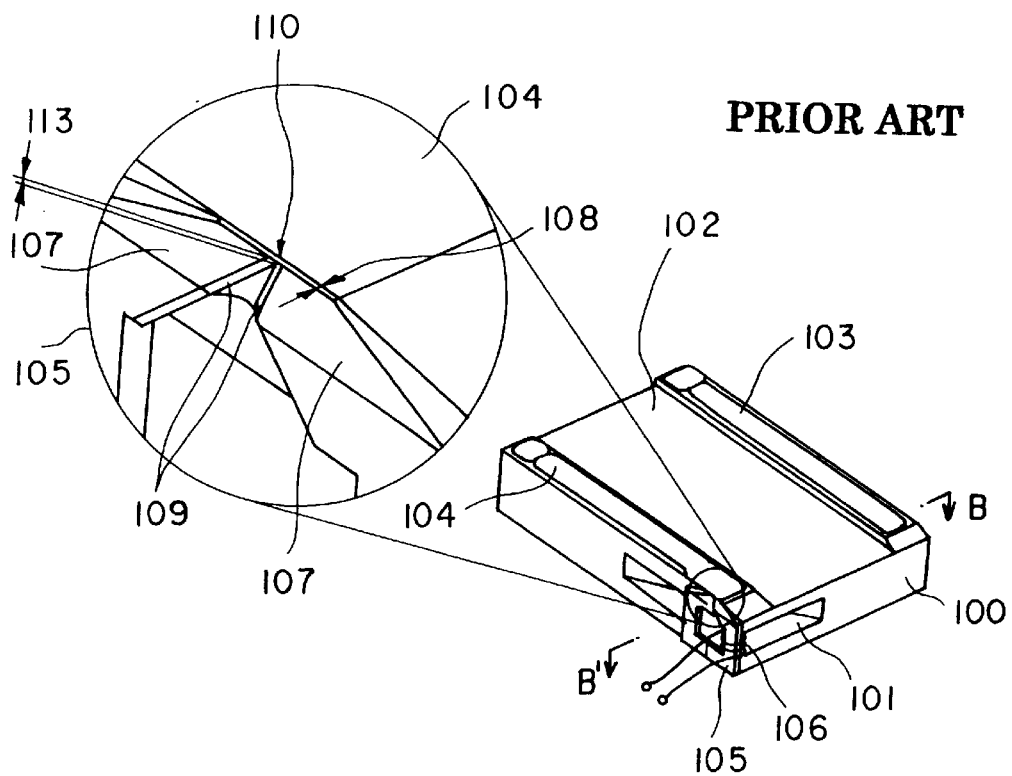
FIG. 20 is a perspective view of a magnetic head slider in the prior art.
Figure 21:
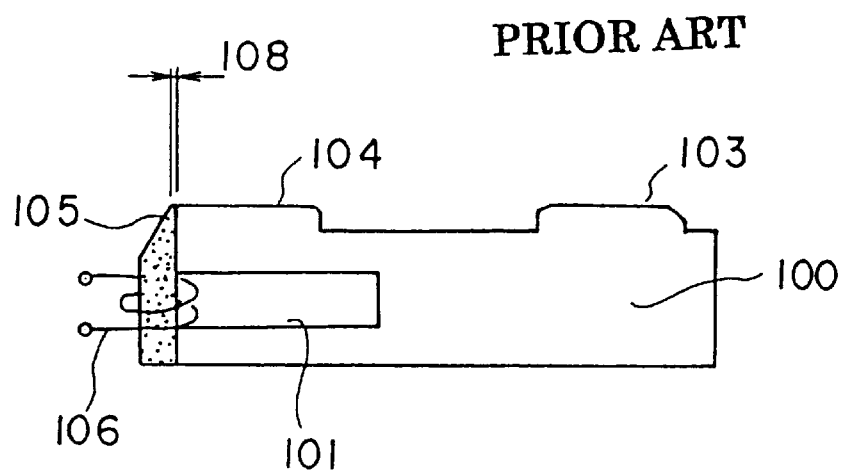
FIG. 21 is a cross sectional view of a magnetic head slider taken on line B–B' of FIG. 20.

The tip of the magnetic core part 9 is ground so that the thin portion 9" and a groove 10' are obtained. In this grinding step, the vicinity of the gap 10 may be made into either the same tapered shape as that of prior art shown in FIG. 20, or a step-like shape where a tip of a gap is cut into a uniformly thin body without any tapered portions. According to the prior art, after a magnetic core alone is ground thin enough that a width of the tip of a gap part is matched with a track width of a magnetic recording medium, the magnetic core is fixed to a magnetic head slider. However, the magnetic core often broke during the fixing step. On the other hand, in the invention, the magnetic core has not been ground enough to form a final thin shape and still remains somewhat thick when it is incorporated into a core housing. After such a magnetic core is fixed rigidly to a coil housing, the vicinity of the gap is ground. Accordingly, the manufacturing method has advantages to reduce the probability of breaking magnet cores and enhance product yield.

Figure 13:
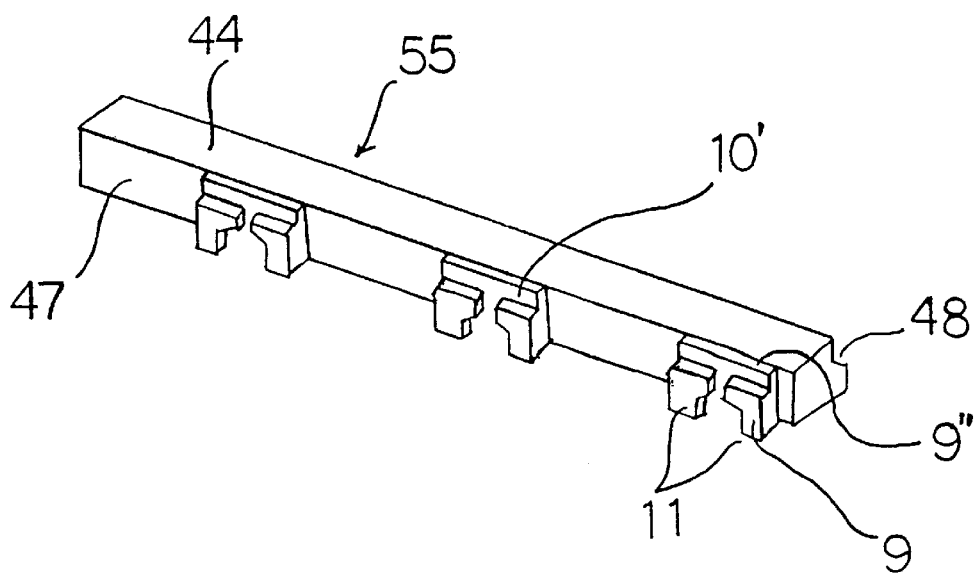
FIG. 13 is a perspective view where magnetic core parts are fixed to a zirconia stick in a manufacturing step of an embodiment of the invention.
Figure 14:
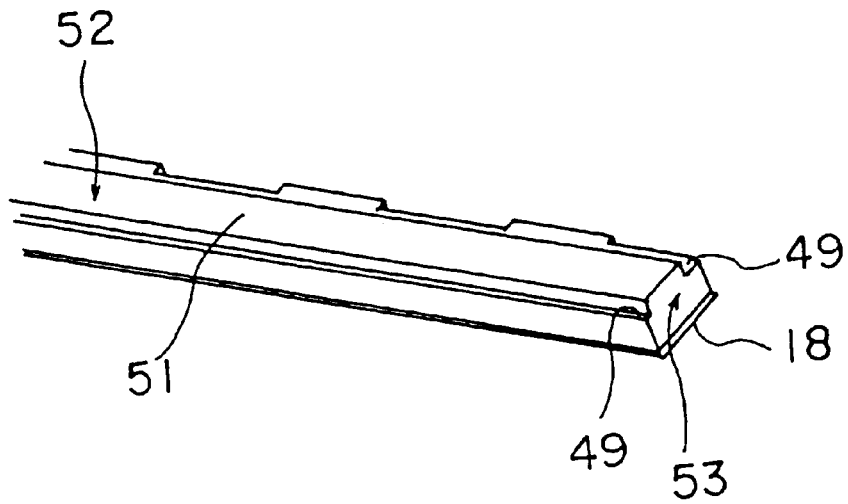
FIG. 14 is a perspective view of a continuous stick body for a coil housing in a manufacturing step of an embodiment of the invention.
Figure 15:
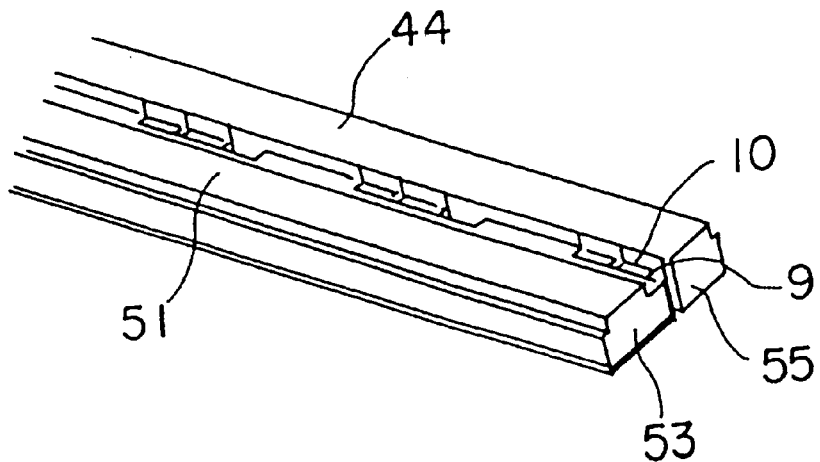
FIG. 15 is a perspective view where a zirconia stick is joined with a continuous stick body in a manufacturing step of an embodiment of the invention.
Figure 16:
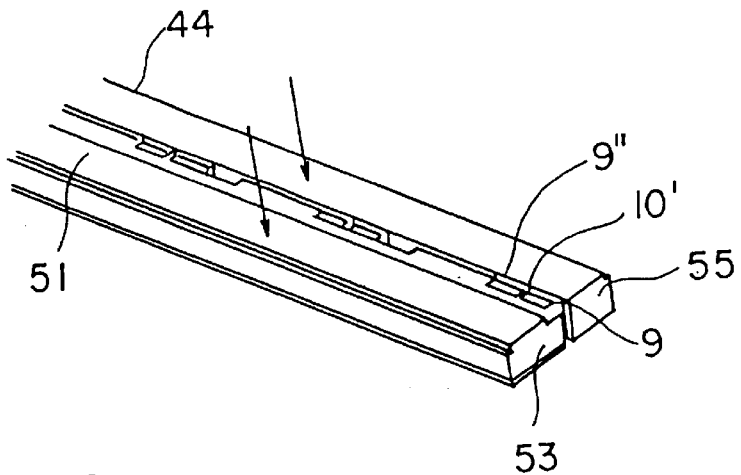
FIG. 16 is a perspective view showing the places where two rail parts are formed in a manufacturing step of an embodiment of the invention.
Figure 17:
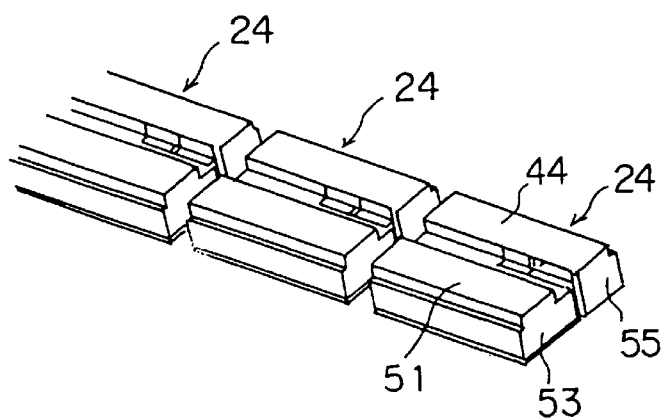
FIG. 17 is a perspective view showing a magnetic head slider produced by a manufacturing method of an embodiment of the invention.

Next, there is provided the non-magnetic plate 18 of zirconia ($ZrO_2$) which has a plurality of square holes for accommodating the thin film coil parts 19 respectively and bears extended terminals 12 corresponding to the holes. Further, as shown in FIG. 14 there is provided a pole body 52 of zirconia ($ZrO_2$) which comprises corner cut portions 49, grooves into which the magnetic core parts are embedded and a protrusion zone 51 for the rail parts 7,8. The non-magnetic plate 18 is fixed to the pole body 52 by glass adhesion and subsequently cut away along both sides of the pole body 52, which finally leads to a continuous body 53 for the coil housing 3. The thin film coil part 19 prepared in a conventional way is embedded adhesively into the square hole in the non-magnetic plate 18, and the coil terminals and the extended terminals are electrically connected to each other. The non-magnetic rod of zirconia ($ZrO_2$) in FIG. 13 is fixed to the continuous body 53 by epoxy adhesion or glass having a low melting point of 100–200° C. There is obtained a substrate made of the continuous body 53 and the zirconia rod 55 of which surfaces, denoted by the arrows in FIG. 16, are ground to thereby adjust a gap depth which is defined as a length over which a couple of core pieces face each other.

Figure 18:
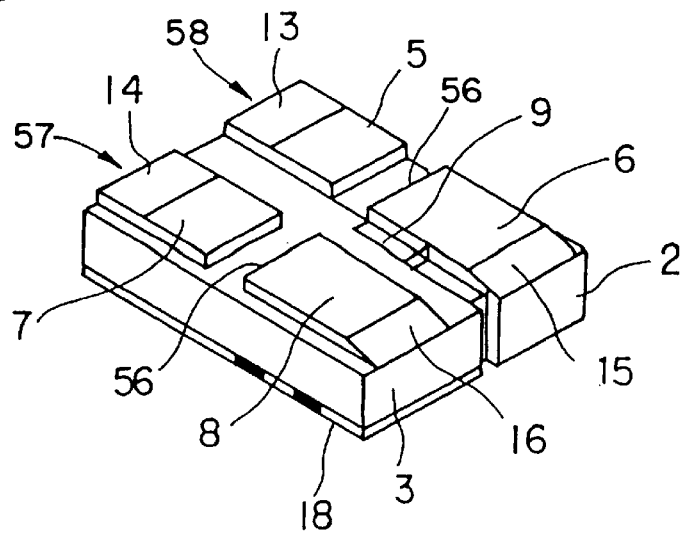
FIG. 18 is a perspective view showing a magnetic head slider in a manufacturing step of another embodiment of the invention.
Figure 19:
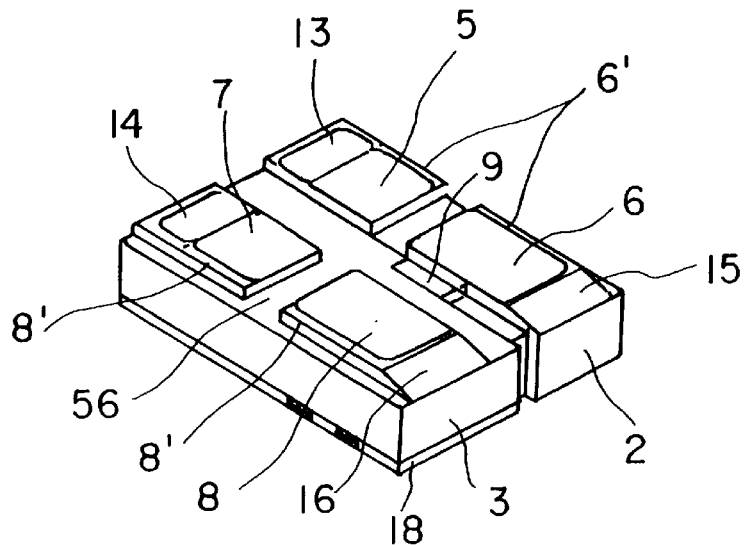
FIG. 19 is a perspective view of a magnetic head slider produced by a manufacturing method of another embodiment of the invention.

It is known that adjusting the precision of a gap depth has a great influence on performance of a magnetic head slider. According to a manufacturing method of the invention, a gap depth is able to be watched if necessary while the surface is ground. After completion of the above grinding step, a base of the body 53 and the rod 55 are cut into a plurality of pieces each having predetermined dimensions. Thus, the magnetic sliders 24 are obtained which are provided with a pair of rail parts 57, 58 like what is disclosed in Japanese Patent Laid-Open No. 6-20245. However, each middle point of the rail parts 57, 58 is ground to form a groove 56 so that four rail parts 5,6 and 7,8 can be obtained as shown in FIG. 18. Whether the number of rail parts is two or four, each air inflow part and air outflow part are slightly slanted downward to at an angle of 0.5–1° and 10–30° respectively.

The outer edge lines of the rails 5,6,7,8 are ground to be provided with buffers 6', 8' having round corners for reducing friction force between the rails and a recording medium. Since there is a magnetic core part between the inner sides of rail parts, any buffers are not provided there. However, it is realized to prevent any contact between the magnetic core part and a recording medium and occurrence of friction loss caused thereby because the width between the rails 5,6 and 7,8 is decreased. Accordingly, this makes it possible to restrain a decrease of a gap depth and a width of the thin portion of the magnetic core part and deformation of the thin portion. As a result, any ill effects on electromagnetic conversion characteristics of the magnetic head slider are avoided.

Although the present invention has been described by way of the above embodiments, it is to be appreciated that a variety of modifications and applications are possible within the scope and sprit of the present invention and are not intended to be excluded from the scope of the present invention.

Thus, according to the present invention there can be provided a magnetic head slider comprising; a housing of non-magnetic material having a rail part on a surface thereof to face a magnetic recording medium for generating a floating force; and a magnetic core part on the housing for writing and reading data, wherein the housing is formed of divided portions; the magnetic core part is disposed between these divided portions; and a gap part of the magnetic core part is positioned substantially flush with a surface of the rail part. Accordingly, even if a traveling surface of a flexible recording medium is shifted for any reason, when the magnetic head slider travels on a flexible recording medium, the magnetic core part never contacts the medium and the gap part of a tip of the magnetic core portion is not worn or lost.

Also the invention can provide a manufacturing method of a magnetic head slider, comprising; a step of fixing a couple of core pieces constituting a magnetic core part to a side surface of one housing portion, a step of grinding the vicinity of the gap part of the couple of core pieces to match the width of the tip of the gap part with the width of a track part of a magnetic recording medium, and a step of joining one housing portion and the other housing portion to sandwich the magnetic core part therebetween. That is, since the core pieces having a thickness, which have not been ground completely yet, are put to one housing portion, they are hardly broken in the fixing step. Use of a thin film coil makes it easy to assemble a magnetic head slider.

What is claimed is:

1. A magnetic head slider for a magnetic recording medium, comprising:

a housing made of non-magnetic material and having a plurality of rails on a surface thereof to face the magnetic recording medium and generate a floating force; and a core received in the housing for reading and writing data relative to the magnetic recording medium, wherein said housing includes a core housing portion having at least a first one of the plurality of rails, and a separate coil housing portion having at least a second one of the plurality of rails, said coil housing portion being connected to a side of the core housing portion via a junction area including a groove, wherein the core includes the core part received in said groove with a gap extending downward from upper surfaces of the at least one first and second ones of the plurality of rails, and a coil part fixed in said coil housing portion and magnetically connected to the core part.

2. The slider according to claim 1, wherein a coil of the coil part is a thin-film coil.

3. The slider according to claim 1, wherein the at least one first and second ones of the plurality of rails are provided in two divided areas of the core housing and coil housing, respectively, and are each divided into rail portions in tandem along a traveling direction of the magnetic recording medium.

4. The slider according to claim 1, wherein an outer edge of each of the at least one first and second ones of the plurality of rails is rounded and forms a buffer corner to contact smoothly a traveling surface of the magnetic recording medium.

* * * * *

UNITED STATES PATENT AND TRADEMARK OFFICE
CERTIFICATE OF CORRECTION

PATENT NO.: 6,008,967
DATED : December 28, 1999
INVENTOR(S): Naomi KAERIYAMA, et al.

It is certified that error appears in the above-identified patent and that said Letters Patent is hereby corrected as shown below:

Col. 1, line 22, change "megabytes" to --mega-bytes--.

Col. 3, line 18, change "there" to --there- --.

Col. 7, line 6, "The" begins a new paragraph.

Signed and Sealed this

Fifth Day of September, 2000

Attest:

Q. TODD DICKINSON

*Attesting Officer*   *Director of Patents and Trademarks*